(12) United States Patent (10) Patent No.: US 11,348,223 B2
Hever et al. (45) Date of Patent: May 31, 2022

(54) METHOD OF ANOMALY DETECTION AND SYSTEM THEREOF

(71) Applicant: UVEYE LTD., Tel Aviv (IL)

(72) Inventors: Amir Hever, Tel-Aviv (IL); Ohad Hever, Modiin (IL); Ilya Bogomolny, Tel-Aviv (IL)

(73) Assignee: UVEYE LTD., Tel Aviv (IL)

( * ) Notice: Subject to any disclaimer, the term of this patent is extended or adjusted under 35 U.S.C. 154(b) by 0 days.

(21) Appl. No.: 17/293,677

(22) PCT Filed: Nov. 11, 2019

(86) PCT No.: PCT/IL2019/051228
§ 371 (c)(1),
(2) Date: May 13, 2021

(87) PCT Pub. No.: WO2020/100136
PCT Pub. Date: May 22, 2020

(65) Prior Publication Data
US 2021/0358115 A1 Nov. 18, 2021

Related U.S. Application Data

(60) Provisional application No. 62/767,526, filed on Nov. 15, 2018.

(51) Int. Cl.
*G06T 7/00* (2017.01)
*G06N 3/04* (2006.01)
*G06N 3/08* (2006.01)

(52) U.S. Cl.
CPC ......... *G06T 7/0008* (2013.01); *G06N 3/0454* (2013.01); *G06N 3/08* (2013.01);
(Continued)

(58) Field of Classification Search
CPC ......... G06T 7/0008; G06T 2207/20081; G06T 2207/20084; G06N 3/0454; G06N 3/08
See application file for complete search history.

(56) References Cited

U.S. PATENT DOCUMENTS 10,176,405 B1 * 1/2019 Zhou .................... G06K 9/6218
2018/0247201 A1 * 8/2018 Liu ......................... G06N 3/088
(Continued)

OTHER PUBLICATIONS

Bi, Lei, et al., "Synthesis of positron emission tomography (PET) images via multi-channel generative adversarial networks (GANs)." In: Molecular Imaging, Reconstruction and Analysis of Moving Body Organs, and Stroke Imaging and Treatment. Springer, Cham, 2017. pp. 43-51 (Jul. 31, 2017).
(Continued)

*Primary Examiner* — John W Lee
(74) *Attorney, Agent, or Firm* — Browdy and Neimark, PLLC

(57) ABSTRACT

There are provided a system and method of training a neural network system for anomaly detection, comprising: obtaining a training dataset including a set of original images and a set of random data vectors; constructing a neural network system comprising a generator, and a first discriminator and a second discriminator operatively connected to the generator; training the generator, the first discriminator and the second discriminator together based on the training dataset, such that: i) the generator is trained, at least based on evaluation of the first discriminator, to generate synthetic images meeting a criterion of photo-realism as compared to corresponding original images; and ii) the second discriminator is trained based on the original images and the synthetic images to discriminate images with anomaly from images without anomaly with a given level of accuracy, thereby giving rise to a trained neural network system.

17 Claims, 8 Drawing Sheets

(52) U.S. Cl.
CPC .............. *G06T 2207/20081* (2013.01); *G06T 2207/20084* (2013.01)

(56) References Cited

U.S. PATENT DOCUMENTS

| | | |
|---|---|---|
| 2018/0322366 A1 | 11/2018 | Lim et al. |
| 2019/0019582 A1* | 1/2019 | Wallis ..................... G06N 3/08 |
| 2019/0066281 A1* | 2/2019 | Zheng .................. G06N 3/0454 |

OTHER PUBLICATIONS

Intrator Y, Katz G, Shabtai A. "Mdgan: Boosting anomaly detection usingWmulti-discriminator generative adversarial networks" arXiv preprint arXiv:1810.05221. (Oct. 11, 2018).

Frid-Adar, Maayan, et al, "GAN-based synthetic medical image augmentation for increased CNN performance in liver lesion classification," Neurocomputing, 2018, 321: pp. 321-331, (Mar. 3, 2018).

* cited by examiner

METHOD OF ANOMALY DETECTION AND SYSTEM THEREOF

TECHNICAL FIELD

The presently disclosed subject matter relates, in general, to the field of anomaly detection, and more specifically, to methods and systems for anomaly detection based on machine learning.

BACKGROUND

Anomaly detection generally refers to identification of items, events or observations which do not conform to an expected pattern, behavior or other items in a dataset. Typically the identified anomalous items can indicate certain kinds of potential problems such as, e.g., defects, threats, malfunctions, frauds, errors, etc.

Generally, in order to identify anomaly from normal instances, both normal and abnormal instances need to be collected in order for a machine learning model to learn their respective characteristics and behaviors. Thus certain anomaly detection techniques require a data set that includes training data labeled as "normal" and "abnormal" and involves training a classifier using the training set. However, since anomalies are normally rare incidences in real life as compared to the normal population, known difficulties exist in collecting sufficient real life training data labeled as abnormal for performing the training.

Attempts have been made to generate artificial abnormal instances for overcoming the above problem. For example, in the case of anomaly detection based on image data, due to the absence of images with anomalies, efforts are made to create synthetic images with anomalies by incorporating images of certain objects into images without anomalies using image processing techniques. However, synthetic images created by such image incorporation are usually not ideal due to variances between the two source images in image properties such as grayscale, illumination, color representations, etc. Using such images for training can affect performance of the trained system and accuracy of the prediction.

There is a need in the art for anomaly detection system with better performance.

GENERAL DESCRIPTION

In accordance with certain aspects of the presently disclosed subject matter, there is provided a computerized method of training a neural network system for anomaly detection, comprising: obtaining a training dataset including a set of original images capturing a target object, and a set of random data vectors, wherein the set of original images include a first subset of original images without presence of anomaly associated with the target object and a second subset of original images with presence of anomaly associated with the target object thereof; constructing a neural network system comprising a generator neural network, and a first discriminator neural network and a second discriminator neural network operatively connected to the generator neural network; training the generator neural network, the first discriminator neural network and the second discriminator neural network together based on the training dataset, such that: i) the generator neural network is trained, at least based on evaluation of the first discriminator neural network, to generate synthetic images meeting a criterion of photo-realism as compared to corresponding original images, wherein at least part of the synthetic images contain a synthetic anomaly generated and associated with the target object thereof; and ii) the second discriminator neural network is trained based on the original images and the synthetic images to discriminate images with presence of anomaly from images without presence of anomaly with a given level of accuracy, thereby giving rise to a trained neural network system.

In addition to the above features, the method according to this aspect of the presently disclosed subject matter can comprise one or more of features (i) to (xi) listed below, in any desired combination or permutation which is technically possible:

(i). The training can be performed iteratively for one or more batches of original images from the first subset together with one or more batches of random data vectors from the set of random data vectors.

(ii). The training can comprise, for a given batch of original images and a generating, by the generator network, a batch of synthetic images based on the given batch of original images and the given batch of random data vectors. At least part of the batch of synthetic images each contains a synthetic anomaly generated and associated with the target object thereof;

training the first discriminator network and the second discriminator network based on the batch of original images and the hatch of synthetic images using a first loss function associated with the first discriminator network and a second loss function associated with the second discriminator network, and training the generator network using at least the first and second loss functions.

(iii). the first discriminator network and the second discriminator network are trained simultaneously, comprising:

providing the batch of original images and the batch of synthetic images to be processed by the first discriminator network, and updating parameters of the first discriminator network according to the first loss function such that the first discriminator network is trained to discriminate synthetic images from original images; and providing a batch of images with presence of anomaly and a batch of images without presence of anomaly to be processed by the second discriminator network, and updating parameters of the second discriminator network according to the second loss function such that the second discriminator network is trained to discriminate images with presence of anomaly from images without presence of anomaly, wherein the hatch of images with presence of anomaly includes one or more original images from the second subset and/or one or more synthetic images containing synthetic anomaly, and the batch of images without presence of anomaly includes one or more original images from the first subset and/or one or more synthetic images not containing synthetic anomaly.

(iv). Training the generator network can comprise updating parameters of the generator network according to at least the first and second loss functions such that the generator network is trained to generate photo-realistic synthetic images at least part of which contain photo-realistic synthetic anomaly.

(v). the first discriminator network and the second discriminator network are trained sequentially, comprising:

providing the batch of original images and the batch of synthetic images to be processed by the first discriminator network, and updating parameters of the first discriminator network according to the first loss function such that the first discriminator network is trained to discriminate synthetic images from original images;

updating parameters of the generator network according to the first loss function such that the generator network is trained to generate photo-realistic synthetic images; providing a hatch of images with presence of anomaly and a hatch of images without presence of anomaly to be processed by the second discriminator network, and updating parameters of the second discriminator network according to the second loss function such that the second discriminator network is trained to discriminate images with presence of anomaly from images without presence of anomaly, wherein the batch of images with presence of anomaly includes one or more original images from the first subset and/or one or more synthetic images containing synthetic anomaly, and the batch of images without presence of anomaly includes one or more original images from the second subset and/or one or more synthetic images not containing synthetic anomaly; and updating parameters of the generator network according to the second loss function such that the generator network is trained to generate photo-realistic synthetic images at least part of which contain photo-realistic synthetic anomaly.

(vi). The generator network can be trained further using a third loss function associated with the generator network such that the batch of synthetic images generated therefrom meets a similarity criterion as compared to the corresponding hatch of original images.

(vii). The method can further comprise validating the neural network system using one or more validation datasets to determine whether the neural network system is properly trained.

(viii). The method can further comprise generating one or more synthetic images with presence of anomaly using the trained neural network system.

(ix). The method can further comprise detecting presence of anomaly in one or more input images using the trained neural network system.

(x). The neural network system can relate to Generative adversarial network (GAN).

(xi). The target object of the set of original images can be a vehicle and the trained neural network can be configured to detect anomaly associated with the vehicle.

In accordance with other aspects of the presently disclosed subject matter, there is provided a computerized system of training a neural network system for anomaly detection, the system comprising a processor and memory circuitry (PMC) configured to: obtain a training dataset including a set of original images capturing a target object, and a set of random data vectors, wherein the set of original images include a first subset of original images without presence of anomaly associated with the target object and a second subset of original images with presence of anomaly associated with the target object thereof; construct a neural network system comprising a generator neural network, and a first discriminator neural network and a second discriminator neural network operatively connected to the generator neural network; train the generator neural network, the first discriminator neural network and the second discriminator neural network together based on the training dataset, such that: i) the generator neural network is trained, at least based on evaluation of the first discriminator neural network, to generate synthetic images meeting a criterion of photo-realism as compared to corresponding original images, wherein at least part of the synthetic images contain a synthetic anomaly generated and associated with the target object thereof; and ii) the second discriminator neural network is trained based on the original images and the synthetic images to discriminate images with presence of anomaly from images without presence of anomaly with a given level of accuracy, thereby giving rise to a trained neural network system.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of training a neural network system for anomaly detection, the method comprising: obtaining a training dataset including a set of original images capturing a target object, and a set of random data vectors, wherein the set of original images include a first subset of original images without presence of anomaly associated with the target object and a second subset of original images with presence of anomaly associated with the target object thereof; constructing a neural network system comprising a generator neural network, and a first discriminator neural network and a second discriminator neural network operatively connected to the generator neural network; training the generator neural network, the first discriminator neural network and the second discriminator neural network together based on the training dataset, such that: i) the generator neural network is trained, at least based on evaluation of the first discriminator neural network, to generate synthetic images meeting a criterion of photo-realism as compared to corresponding original images, wherein at least part of the synthetic images contain a synthetic anomaly generated and associated with the target object thereof; and ii) the second discriminator neural network is trained based on the original images and the synthetic images to discriminate images with presence of anomaly from images without presence of anomaly with a given level of accuracy, thereby giving rise to a trained neural network system.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a computerized method of anomaly detection, comprising: receiving an input image capturing a target object; and determining presence of anomaly associated with the target object in the input image using a discriminator neural network, wherein the discriminator neural network is trained together with a generator neural network operatively connected to the discriminator neural network and an additional discriminator neural network operatively connected to the generator neural network, such that: i) the generator neural network is trained, at least based on evaluation of the additional discriminator neural network, to generate synthetic images meeting a criterion of photo-realism as compared to corresponding original images, wherein at least part of the synthetic images contain a synthetic anomaly generated and associated with the target object thereof; and ii) the discriminator neural network is trained based on the original images and the synthetic images to discriminate images with presence of anomaly from images without presence of anomaly with a given level of accuracy.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a computerized system of anomaly detection, the system comprising a processor and memory circuitry (PMC) configured to: receive an input image capturing a target object; and determine presence of anomaly associated with the target object in the input image using a discriminator neural network, wherein the discriminator neural network is trained together with a generator neural network operatively connected to the discriminator neural network and an additional discriminator neural network operatively connected to the generator neural network, such that: i) the generator neural network is trained, at least based on evaluation of the additional discriminator neural network, to generate synthetic images meeting a criterion of photo-realism as compared to corresponding original images, wherein at least part of the synthetic images contain a synthetic anomaly generated and associated with the target object thereof; and ii) the discriminator neural network is trained based on the original images and the synthetic images to discriminate images with presence of anomaly from images without presence of anomaly with a given level of accuracy.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized method of anomaly detection, the method comprising: receiving an input image capturing a target object; and determining presence of anomaly associated with the target object in the input image using a discriminator neural network, wherein the discriminator neural network is trained together with a generator neural network operatively connected to the discriminator neural network and an additional discriminator neural network operatively connected to the generator neural network, such that: i) the generator neural network is trained, at least based on evaluation of the additional discriminator neural network, to generate synthetic images meeting a criterion of photo-realism as compared to corresponding original images, wherein at least part of the synthetic images contain a synthetic anomaly generated and associated with the target object thereof; and ii) the discriminator neural network is trained based on the original images and the synthetic images to discriminate images with presence of anomaly from images without presence of anomaly with a given level of accuracy.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a computerized method of anomaly generation, comprising:

receiving an input image capturing a target object and a random data vector; and generating a photo-realistic synthetic image containing photo-realistic synthetic anomaly generated and associated with the target object using a generator neural network, wherein the generator neural network is trained together with a first discriminator neural network and a second discriminator neural network operatively connected to the generator neural network, such that: i) the generator neural network is trained, at least based on evaluation of the first discriminator neural network, to generate synthetic images meeting a criterion of photo-realism as compared to corresponding original images, wherein at least part of the synthetic images contain a synthetic anomaly generated and associated with the target object thereof; and the second discriminator neural network is trained based on the original images and the synthetic images to discriminate images with presence of anomaly from images without presence of anomaly with a given level of accuracy.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a computerized system of anomaly generation, the system comprising a processor and memory circuitry (PMC) configured to: receive an input image capturing a target object and a random data vector; and generate a photo-realistic synthetic image containing photo-realistic synthetic anomaly generated and associated with the target object using a generator neural network, wherein the generator neural network is trained together with a first discriminator neural network and a second discriminator neural network operatively connected to the generator neural network, such that: i) the generator neural network is trained, at least based on evaluation of the first discriminator neural network, to generate synthetic images meeting a criterion of photo-realism as compared to corresponding original images, wherein at least part of the synthetic images contain a synthetic anomaly generated and associated with the target object thereof; and ii) the second discriminator neural network is trained based on the original images and the synthetic images to discriminate images with presence of anomaly from images without presence of anomaly with a given level of accuracy.

This aspect of the disclosed subject matter can comprise one or more of features (i) to (xi) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of anomaly generation, the method comprising: receiving an input image capturing a target object and a random data vector; and generating a photo-realistic synthetic image containing photo-realistic synthetic anomaly generated and associated with the target object using a generator neural network, wherein the generator neural network is trained together with a first discriminator neural network and a second discriminator neural network operatively connected to the generator neural network, such that: i) the generator neural network is trained, at least based on evaluation of the first discriminator neural network, to generate synthetic images meeting a criterion of photo-realism as compared to corresponding original images, wherein at least part of the synthetic images contain a synthetic anomaly generated and associated with the target object thereof; and ii) the second discriminator neural network is trained based on the original images and the synthetic images to discriminate images with presence of anomaly from images without presence of anomaly with a given level of accuracy.

This aspect of the disclosed subject matter can comprise one or more of features (i) to (xi) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
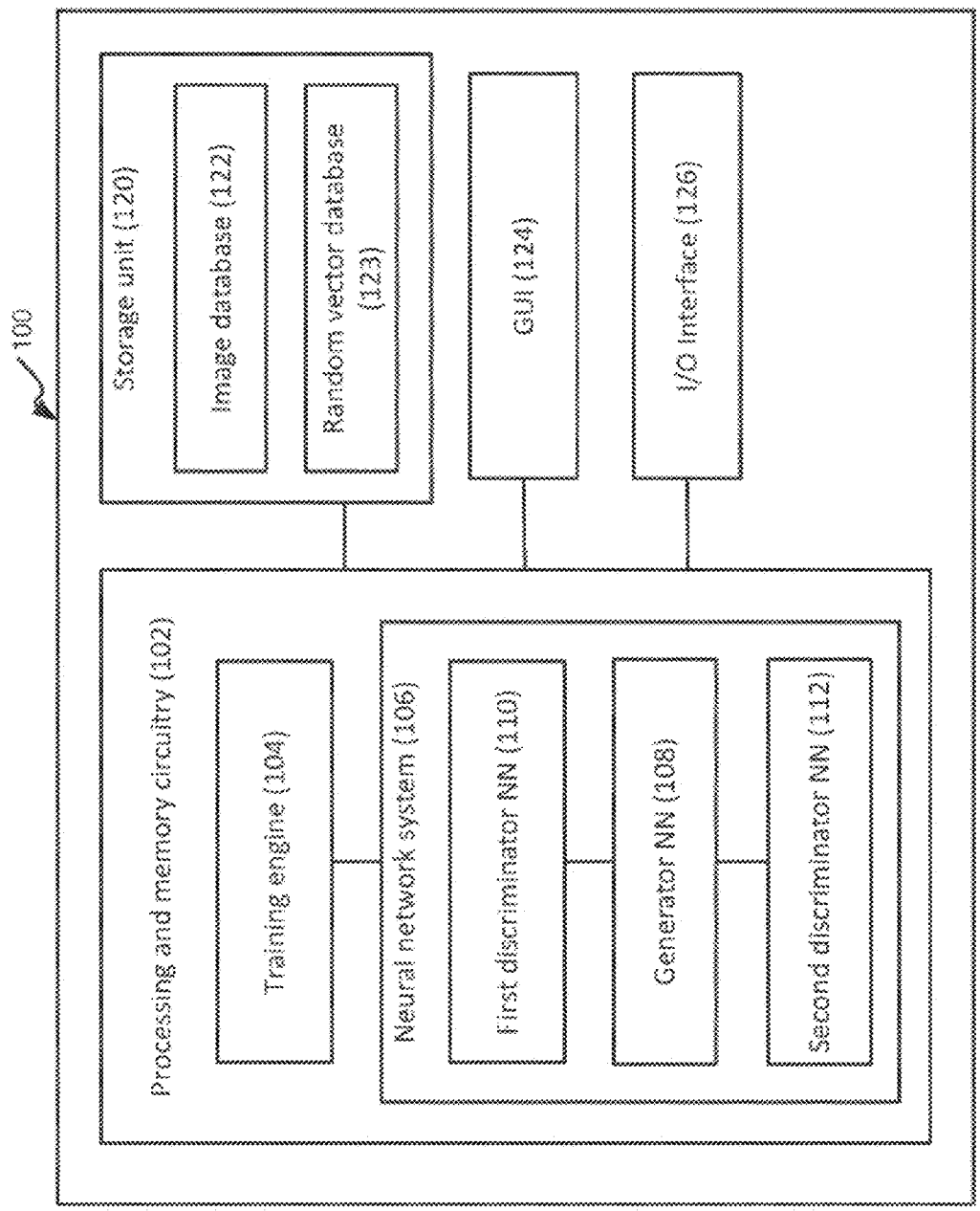
FIG. 1 schematically illustrates a block diagram of a computerized system capable of training a neural network system for anomaly detection in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "capturing", "constructing", "training", "meeting", "generating", "performing", "updating", "providing", "validating", "detecting", "receiving", "determining", "discriminating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of training a neural network system for anomaly detection, the computerized system of anomaly detection, the computerized system of anomaly generation, the neural network system and the processing and memory circuitry (PMC) of these systems as disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed, subject matter one or more stages illustrated in the figures may be executed in a different order and/or one or more groups of stages may be executed simultaneously and vice versa.

Bearing this in mind, attention is drawn to FIG. 1, schematically illustrating a block diagram of a computerized system capable of training a neural network system for anomaly detection in accordance with certain embodiments of the presently disclosed subject matter.

The system 100 illustrated in FIG. 1 is a computer-based training system for training a neural network system 106. The neural network system 106 is configured for the purpose of anomaly detection, and comprises a generator neural network (also referred to herein as generator or generator network) 108, and a first discriminator neural network (also referred to herein as first discriminator or first discriminator network) 110 and a second discriminator neural network (also referred to herein as second discriminator or second discriminator network) 112 operatively connected to the generator neural network 108.

A neural network system that is composed of two neural networks contesting with each other in a zero-sum game framework is normally referred to as Generative adversarial network (GAN). The generator network G is trained to generate samples/instances by transforming data vectors into a specific data distribution of interest, while the discriminator network D is trained to discriminate between instances from the true data distribution and instances produced by the generator. The generator network's training objective is to increase the error rate of the discriminator network (i.e., "fool" the discriminator network by producing novel synthesized instances that appear to have come from the true data distribution), and the discriminator network's training objective is to distinguish instances generated from the generator from real data with a high level of accuracy.

The neural network system 106 as disclosed in the present disclosure differs from the above described GAN structure at least in that it comprises one generator network and two discriminator networks each configured for different functionalities, as described in further detail below.

The neural network system 106 can be configured to generate and detect different types of anomalies, i.e., anomalies existing in different types of input data. In order to train the neural network system 106, a training dataset can be obtained, The training dataset can include any type of original data, such as images, audio, text, etc., depending on the specific functionality that the neural network system 106 is configured for. According to some embodiments, the training dataset can include a set of original images capturing a target object and a set of random data vectors. The set of original images can include a first subset of original images without presence of anomaly associated with the target object and a second subset of original images with presence of anomaly associated with the target object thereof. For instance, the target object can be a vehicle or part thereof (e.g., vehicle undercarriage).

In some cases, the training dataset can be obtained from a local storage unit 120 which comprises an image database 122 configured to store the set of the original images and a random vector database 123 configured to store the set of random data vectors. In some other cases, the image database 122 and the random vector database 123 can reside external to system 100, e.g., in one or more external data repositories, or in an external system or provider that operatively connect to system 100, and the training dataset can be retrieved via a hardware-based I/O interface 126.

As illustrated, system 100 can comprise a processing and memory circuitry (PMC) 102 operatively connected to the I/O interface 126 and the storage unit 120. PMC 102 is configured to provide all processing necessary for operating system 100 which is further detailed with reference to FIGS. 2-3. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein processing capabilities, and the present disclosure is not limited to the type or platform thereof, or number of processing cores comprised therein.

In certain embodiments, functional modules comprised in the PMC 102 can comprise a training engine 104 and a neural network system 106. The functional modules comprised in the PMC are operatively connected with each other. The training engine 104 can be configured to control the training process of the neural network system 106, namely, to train the generator network, the first discriminator network and the second discriminator network together based on the training dataset. The neural network system 106 is trained such that: i) the generator neural network 108 is trained, at least based on evaluation of the first discriminator neural network, to generate synthetic images meeting a criterion of photo-realism as compared to corresponding original images; and ii) the second discriminator network is trained based on the original images and the synthetic images to discriminate images with presence of anomaly from images without presence of anomaly with a given level of accuracy, as will be described, in further detail below with reference to FIGS. 3 and 4. At least some/part of the synthetic images each contains a synthetic anomaly generated and associated with the target object of the corresponding original image.

The I/O interface 126 can be configured to obtain, as input, the training dataset from storage unit/data repository, and provide, as output, a trained neural network system as described above. Optionally, system 100 can further comprise a graphical user interface (GUI) 124 configured to render for display of the input and/or the output to the user. Optionally, the GUI can be configured to enable user-specified inputs for operating system 100.

Once trained, the neural network system, in particular, the trained second discriminator neural network 112 can be used as an anomaly detection system in the inference stage (i.e., when the system is put in operation/production) for receiving input images and determining presence of anomaly associated in the input images. The trained generator neural network 108 can be used as an anomaly generation system for generating a photo-realistic synthetic image based on an input image and a random data vector. The generated synthetic image contains photo-realistic synthetic anomaly generated and associated with a target object in the input image.

The anomaly generation system and anomaly detection system trained in such a way, as compared to the known methods, are advantageous at least in that with the help of the first discriminator, the generator can generate synthetic images that are very close to real images (i.e., with high level photo-realism as compared to real images). These synthetic images are used as training data to train the second discriminator such that the trained second discriminator can reach a high level of accuracy or success rate of discriminating images with anomaly from images without anomaly when facing real input images. This is because the second discriminator is trained with high quality of training data (i.e., the training images are close to what they system will encounter when put into production).

On the contrary, using synthetic images created by image incorporation as mentioned above (e.g., by incorporating images of certain objects into images without anomalies using image processing techniques) as training data for training the second discriminator can affect performance of the trained system, in particular the accuracy of the prediction, since synthetic images created in such a way usually have a low level of "realness". This can be due to variances between the two source images in image properties such as grayscale, illumination, color representations, etc. which made the incorporated images to appear less real. For instance, in an incorporated image, the incorporated object(s) may look very different from the background image thus the discriminator can easily tell that there is anomaly present in such image. Without providing the discriminator with more challenging images, the discriminator will not be able to learn the characteristics of real images thus cannot provide good performance in operation when the input images are all real images with anomalies. On the other hand, attempts of trying to make the incorporated images to appear more real by using further image processing techniques can be cumbersome and inefficient, thus are not practical for providing a relatively large amount of training data for training the system.

Therefore, the present disclosure provides an optimized training process of the neural network system which can overcome the above problems, and can produce trained anomaly generation system and/or anomaly detection system with high performance in inference stage.

As aforementioned, the anomaly detection system trained in such a way can be used for anomaly detection for various purposes and applications, such as, e.g., security purposes, regular checkup and maintenance purposes, etc. By way of example, in the case of the target object being a vehicle, for security purposes, the anomaly detection system can be used for detection of any illegal contraband, potential explosive and any visible mechanical modification to the vehicle. By way of another example, for general automotive purposes, the anomaly detection system can be used for detection of, e.g., rust, oil leakage, missing parts, change in tire condition, and any mechanical damages, such as dents, scratches etc. in some cases, the system can also be trained for detecting anomalies in audio signals or sound files when being provided with training audio data. Such anomalies detected in audio may be indicative of, e.g., certain mechanical issues of the vehicle etc. It is to be appreciated that the present disclosure is not limited by any specific application or usage of the system.

It is also noted that the system illustrated in FIG. 1 can be implemented in a distributed computing environment, in which the aforementioned functional modules shown in FIG. 1 can be distributed over several local and/or remote devices, and can be linked through a communication network.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware. The system in FIG. 1 or at least certain components thereof can be a standalone network entity, or integrated, fully or partly, with other network entities. Those skilled in the art will also readily appreciate that the data repositories or storage unit therein can be shared with other systems or be provided by other systems, including third party equipment.

According to certain embodiments, the generator, the first discriminator and/or the second discriminator, once trained, can be employed as standalone computer systems for implementing respective functionalities, e.g., image generation, real/fake image discrimination, anomaly image discrimination (i.e., anomaly detection). These computer systems can be implemented in a similar manner as system 100 as illustrated in FIG. 1, i.e., each of the computer systems can comprise respective PMC, storage unit and I/O interface configured for implementing the system functionalities in accordance with computer-readable instructions implemented on respective non-transitory computer-readable memory comprised in the PMC.

Figure 2:
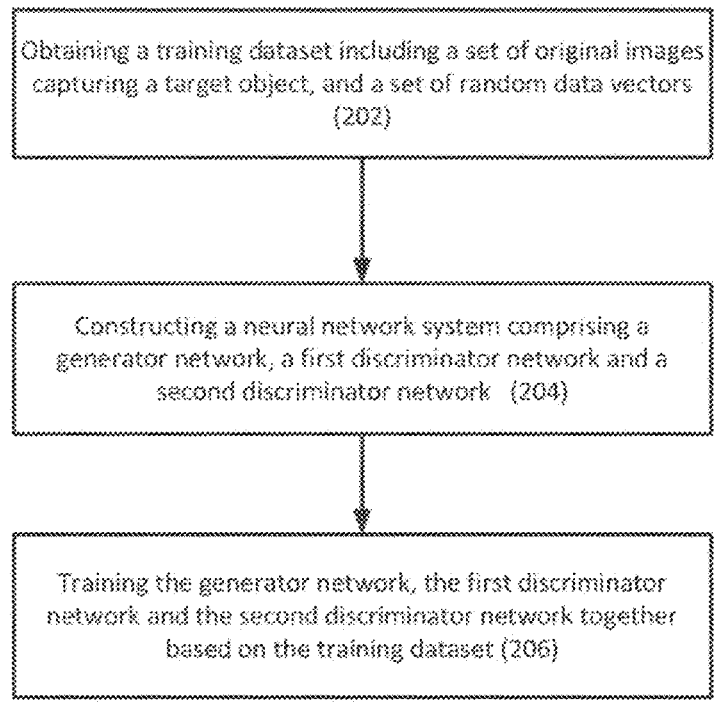
FIG. 2 illustrates a generalized flowchart of training a neural network system for anomaly detection in accordance with certain embodiments of the presently disclosed subject matter.
Figure 3:
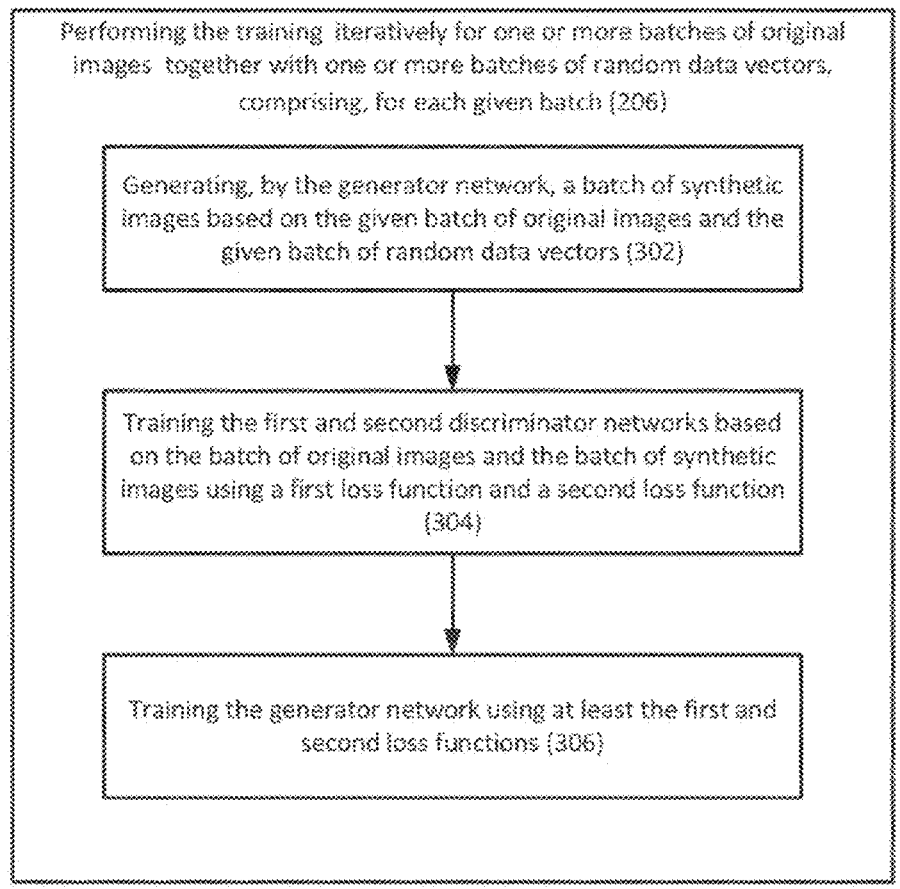
FIG. 3 illustrates an exemplified training process for each given batch in accordance with certain embodiments of the presently disclosed subject matter.

While not necessarily so, the process of operation of system 100 can correspond to some or all of the stages of the methods described with respect to FIGS. 2-3. Likewise, the methods described with respect to FIGS. 2-3 and their possible implementations can be implemented by system 100. It is therefore noted that embodiments discussed in relation to the methods described with respect to FIGS. 2-3 can also be implemented, mutatis mutandis as various embodiments of the system 100 and vice versa.

Referring now to FIG. 2, there is illustrated a generalized flowchart of training a neural network system for anomaly detection in accordance with certain embodiments of the presently disclosed subject matter.

As aforementioned, the anomaly detection referred to herein can include detection of different types of anomalies. Therefore, the training dataset used to train the neural network system can include any type of original data, such as images, audio, text, etc., depending on the specific type of anomaly detection that the neural network system is configured for. According to certain embodiments, a training dataset can be obtained (e.g., by the PMC 102 via I/O interface 126, or from the storage unit 120, as illustrated in FIG. 1) including a set of original images capturing a target object and a set of random data vectors. The set of original images can include a first subset of original images without presence of anomaly associated with the target object (images without presence of anomaly associated with the target object are also referred to herein as images without anomaly or images not containing anomaly) and a second subset of original images with presence of anomaly associated with the target object thereof (images with presence of anomaly associated with the target object are also referred to herein as images with anomaly or images containing anomaly).

The original images used herein refer to real/natural images captured by any kind of image acquisition device(s) in any suitable format, as in contrast to synthetic images which are artificially synthesized based on certain input data. The original images typically capture a target object which can be any object of interest. The present disclosure is not limited by the type, size and format of the original images and/or the specific target object. For instance, the target object can be a vehicle or part thereof (e.g., vehicle undercarriage). It is to be noted that the term "vehicle" used herein should be expansively construed to cover any kind of motor vehicle, including but not limited to cars, buses, motorcycles, trucks, trains, and airplanes, etc. According to certain embodiments, the random data vectors are generated as pseudo-random data vectors using a random data generator. In some cases, the random data vectors can be random noise vectors.

According to certain embodiments of the present disclosure, when the neural network system is trained for anomaly detection in images, anomaly can refer to any item, object or observation appeared in the image that does not conform to an expected pattern, behavior or other items in the image. Typically an identified anomaly can indicate certain kinds of potential defects, threats, malfunctions, etc. By way of example, in the case of the target object in the image being a vehicle undercarriage, the anomaly can be an additional object(s) embedded therein which does not originally belong to the vehicle, or an existing object(s) observed in a different appearance than expected. By way of another example, the anomaly can be a suspicious observation of the vehicle undercarriage, for instance, the frame of the undercarriage was painted to a different color which distinguish from a regular undercarriage appearance. By way of another example, in the case of the target object in the image being a vehicle tire/wheel, the anomaly can refer to damages or wear-out (such as scratches) on the tire. It is to be noted that the anomaly referred to herein should be construed to include at least one anomaly, and the present disclosure is not limited by the number of anomalies generated or detected in one image.

A neural network system can be constructed/initialized (204) (e.g., by the PMC 102). The neural network system comprises a generator neural network, and a first discriminator neural network and a second discriminator neural network operatively connected to the generator neural network. The parameters of the neural network system (e.g., weights, bias, and/or threshold values, etc.) can be initially selected. As aforementioned, the neural network system as disclosed herein proposes a new structure composed of one generator operatively connected to two discriminators, as compared to the above described GAN system. The three neural networks are trained together so as to improve the performance of one another. For instance, the trained anomaly detection system can have a high performance (i.e., to reach a relatively high level of accuracy of prediction) when encountering real images with anomalies in the inference stage, as described below in detail with reference to block 206, FIGS. 3 and 4.

Upon obtaining the training dataset and constructing the neural network system, the generator neural network, the first neural discriminator network and the second discriminator neural network can be trained (206) (e.g., by the training engine 104 as comprised in the PMC 102) together based on the training dataset. The generator neural network is trained, at least based on evaluation of the first discriminator neural network, to generate synthetic images meeting a criterion of photo-realism as compared to corresponding original images. The term photo-realism or photo-realistic used herein refers to a reproduced or synthetic image that looks as realistic/close as possible to the original/reference image, and the level of photo-realism provides a measurement of the degree of the realism/realness of the synthetic image as compared to the corresponding original image. At least part of the synthetic images each contains a synthetic anomaly generated and associated with the target object thereof. The second discriminator neural network is trained based on the original images and the synthetic images to discriminate images with presence of anomaly from images without presence of anomaly with a given level of accuracy, thereby giving rise to a trained neural network system.

According to certain embodiments, the training with reference to block 206 can be performed iteratively for one or more batches of original images from the first subset (i.e., original images without presence of anomaly associated with the target object, also referred to as clean original images) together with one or more batches of random data vectors from the set of random data vectors.

An exemplified training process for each given batch is described with reference to FIG. 3 in accordance with certain embodiments of the presently disclosed subject matter.

Turning now to FIG. 3, for a given batch of original images and a corresponding batch of random data vectors, a batch of synthetic images can be generated (302) by the generator network based on the given batch of original images and the given batch of random data vectors. Each of at least part/some of the batch of synthetic images can contain a synthetic anomaly generated and associated with the target object thereof. A batch used herein refers to a training unit which can include any number of images/vectors ranging from 1 to N (N>1), and the present disclosure is not limited by a specific number of images/vectors included in a batch. For instance, the training process as described in FIG. 3 can be performed per each original image and data vector (i.e., the batch include one image/vector), or it can be performed for every N images and N corresponding data vectors.

The generator network can be implemented in various ways using different types of neural networks. According to certain embodiments, the generator can be implemented as comprising an autoencoder. Autoencoder is a type of neural network which is normally used for the purpose of data reproduction by learning efficient data coding. An autoencoder always consists of two parts, the encoder and the decoder. The autoencoder learns to compress data from the input layer into a short code (i.e., the encoder part), and then decompress that code into an output that closely matches the original data (i.e., the decoder part). The autoencoder normally has an input layer, an output layer and one or more hidden layers connecting them. The output layer has the same number of nodes as the input layer with the purpose of reconstructing its own inputs. For each original image in the training dataset to be fed into the generator, the generator can reconstruct it to a reconstructed image using the autoencoder comprised therein, as exemplified with reference to FIG. 5.

Figure 5:
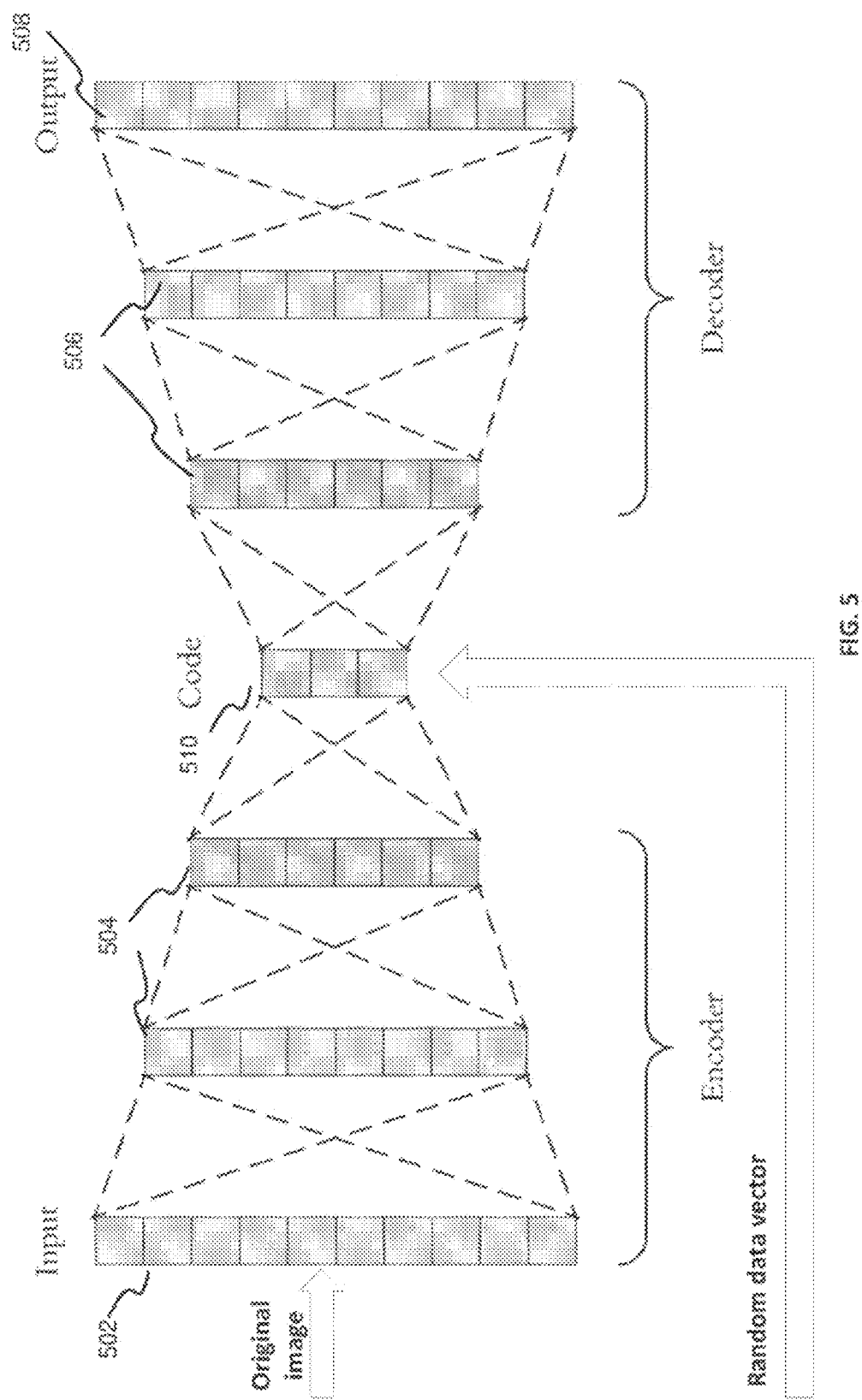
FIG. 5 illustrates a schematic illustration of a simplified structure of an autoencoder in accordance with certain embodiments of the presently disclosed subject matter.

Turning now to FIG. 5, there is shown a schematic illustration of a simplified structure of an autoencoder in accordance with certain embodiments of the presently disclosed subject matter.

The autoencoder as exemplified in FIG. 5 comprises two convolutional layers 504 and two deconvolutional layers 506 in addition to the input layer 502 and output layer 508. When receiving an original image as the input, the first convolutional layer performs convolution between given pixels of the input layer 502 and the kernel/filter matrices that store parameters (e.g., weights) in order to extract respective features from the input. The second convolution layer takes the output of the first convolution layer as input and performs convolution in a similar manner using its own kernel matrices. The output of the second layer (i.e., the output of the encoder) is referred to as code 510, latent variables, or latent representation representative of the original image. Convolution stride can be properly set in order to reduce the dimension of the output of each layer. The code can then pass the two deconvolution layers 506 and be restored to the original size in the output layer 508. The output of the autoencoder is a reconstructed image corresponding to the input original image. Note that since the original image is a clean original image (i.e., image without any anomaly), the reconstructed image at this stage is supposed to be a clean reconstructed image.

In addition to a given original image, the input to the generator also includes a corresponding random data vector which can be used by the generator to reconstruct and create synthetic anomaly to be incorporated/embedded in the reconstructed image of the original image. According to certain embodiments, the set of random data vectors used for the training can be generated using a random data generator algorithm. In some cases, they can be generated based on prior knowledge of images of various objects. For instance, one or more images of certain objects can be passed through the encoder part of an autoencoder that has a similar structure as described above, and the codes generated can be used as or transformed to data vectors (or used as basis for generating the data vectors) which can serve as input to the generator.

There are various ways of implementations that can be used by the generator to generate an image of synthetic anomaly based on a random data vector. According to certain embodiments, the random data vectors can be considered as passing through layers similar to those in a decoder so as to be reconstructed to a synthetic image of an anomaly. As exemplified in FIG. 5, in some embodiments, the random data vector can be fed into the code layer 510 and be integrated/combined with the code representative of the original image, and the integrated code can be used as input to the decoder to generate arm output of synthetic image corresponding to the original image but incorporating a synthetic anomaly (due to the integration of the random data vector).

The generator configured in such a way can generate synthetic images containing/incorporating synthetic anomalies based on the original images and random data vectors. It is to be noted that not all the generated synthetic image necessarily contain an anomaly. In some embodiments, the generator can be configured to control the influence of the random data vector in the generation process. By way of example, some of the synthetic images are generated with a zero input of random data vector. In such cases, the generated synthetic images are just reconstructed images of the original images which thus do not contain anomalies. In other cases, the synthetic images generated based on both inputs of original images and random data vectors contain synthetic anomalies. The synthetic anomalies can be associated with or related to the target object included in the image. For instance, in the case of the original image including a target object of a vehicle undercarriage, the generated synthetic image with anomaly can contain a synthetic object (e.g., an extra object) attached to a part (e.g., the exhaust pipe) of the undercarriage.

Referring back to FIG. 3, upon the batch of synthetic images being generated as described with reference to block 302, the first discriminator network and the second discriminator network can be trained (304) based on the batch of original images and the batch of synthetic images using a first loss function associated with the first discriminator network and a second loss function associated with the second discriminator network, and the generator network can be trained (306) using at least the first and second loss functions.

Figure 6:
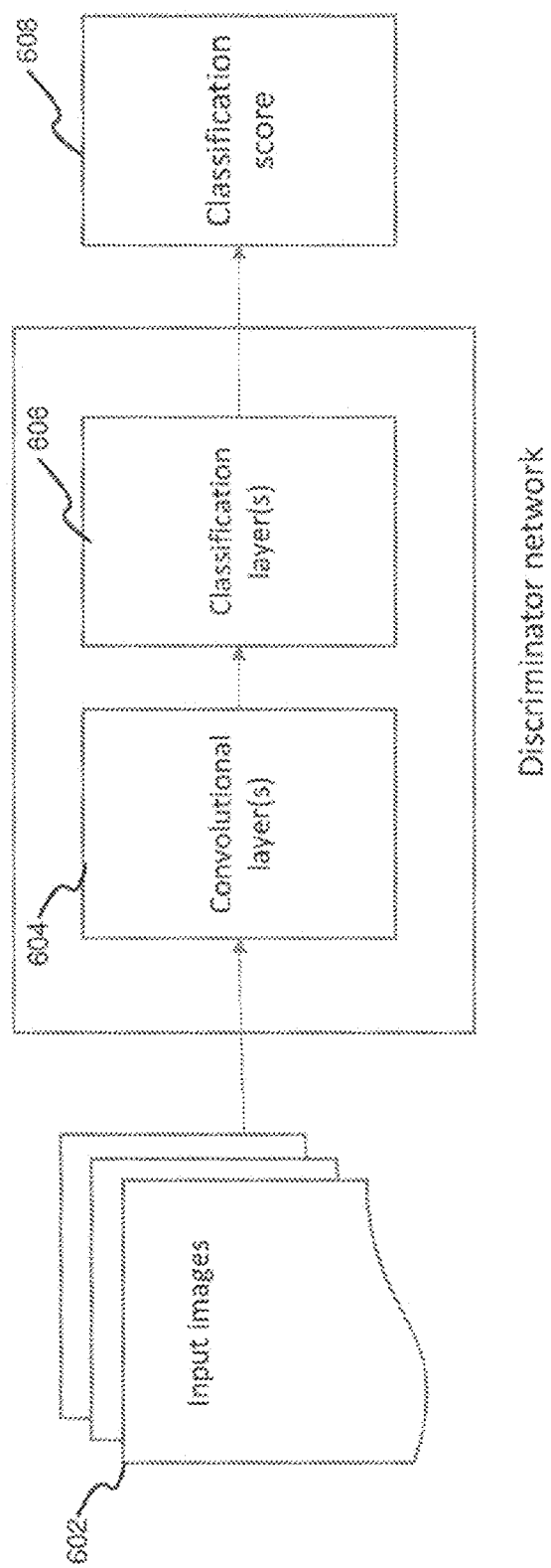
FIG. 6 shows a schematic illustration of an exemplified discriminator network in accordance with certain embodiments of the presently disclosed subject matter.

In some embodiments, a discriminator network can typically comprise one or more (e.g., in some cases, three or more) convolutional layers possibly followed by one or more (e.g., in some cases, two or more) fully connected layers. The output of the discriminator can be of different dimensions/resolutions, e.g., per-image prediction, per-segment prediction (if the image has been segmented previously) or pixel-wise prediction. A schematic illustration of an exemplified discriminator network is shown in FIG. 6 in accordance with certain embodiments of the presently disclosed subject matter. As shown, FIG. 6 illustrates a network architecture which includes one or more convolutional layers 604 for feature extraction and one or more fully connected layers for classification (i.e., classification layers 606). The input to the discriminator network are input images 602 as specified above, and the output of the discriminator network can be classification score(s) 608 representing the discrimination prediction. As mentioned above, in some cases, the discriminator can be designed to predict segment-wise or pixel-wise probability.

According to certain embodiments, the first discriminator network and the second discriminator network can be trained simultaneously or in an ordered manner. In one embodiment, respective inputs can be provided to the two discriminator networks (substantially) at the same time, and the two discriminator networks can be trained (substantially) simultaneously. Specifically, the batch of original images and the batch of synthetic images can be provided to be processed by the first discriminator network, and parameters of the first discriminator network can be updated according to the first loss function such that the first discriminator network is trained (e.g., through back propagation) to discriminate synthetic images from original images.

At the same time a batch of images with presence of anomaly and a batch of images without presence of anomaly can be provided to be processed by the second discriminator network, and parameters of the second discriminator network can be updated according to the second loss function such that the second discriminator network is trained to discriminate images with presence of anomaly from images without presence of anomaly. The batch of images with presence of anomaly includes one or more original images from the second subset (i.e., the original images with presence of anomaly) and/or one or more synthetic images containing synthetic anomaly, and the batch of images without presence of anomaly includes one or more original images from the first subset (i.e., the original images without presence of anomaly) and/or one or more synthetic images not containing synthetic anomaly.

It is to be noted that since the two discriminators are configured for different discrimination functionalities, the labeled inputs used to train each discriminator are also different. The first discriminator is configured to discriminate between synthetic images and original images. Thus the two types of inputs provided thereto are synthetic images as generated by the generator and original images, irrespective of whether the images contain anomalies or not. The second discriminator is configured to discriminate between images with anomaly and images without anomaly. Thus the two types of inputs provided thereto are batches of images with presence of anomaly and batches of images without presence of anomaly, irrespective of whether the images are original or synthetic.

While the first and second discriminators are trained, the parameters of the generator network can be updated according to at least the first and second loss functions such that the generator network is also trained to generate photo-realistic synthetic images at least part of which contain photo-realistic synthetic anomaly. Specifically, with the evaluation of the first discriminator as indicated by the first loss function, the generator can be trained to generate synthetic images that are more real (i.e., photo-realistic), while with the evaluation of the second discriminator as indicated by the second loss function, the generator can be trained to generate images that contains more real anomalies.

The first and second loss functions used herein refers to computational functions representing cost paid for inaccuracy of prediction in classification problems using machine learning. By way of example, the first loss function can be represented as a log loss, such as, e.g., $F = -\Sigma_{c=1}^{M} y_{o,c} \log(P_{o,c})$, where M is the number of classes, 2 in this case, log is the natural log, y is a binary indicator indicating the class label of observation o, and P is the predicted probability that observation o is of class c. The first discriminator can be trained to maximize the output of this function so that it can reach a high level of accuracy or success rate when distinguishing the synthetic images from the original ones, while the generator is trained to minimize the output of this function so that it can generate more real images that can fool the discriminator.

By way of example, the second loss function can be represented in a similar way as the first loss function. The second discriminator is trained to maximize the output of this function so that it can reach a high level of accuracy or success rate when distinguishing images with anomalies from images without, while the generator is trained to minimize the output of this function so that it can generate images with more real anomalies that can fool the discriminator.

In another embodiment, the first discriminator network and the second discriminator network can be trained in an ordered manner (e.g., one after another, or sequentially). By way of example, for each batch of training data, the first discriminator can be trained first and with the evaluation of the first discriminator, the generator can be trained so as to provide better quality of images to train the second discriminator. Specifically, the batch of original images and the batch of synthetic images can be provided to be processed by the first discriminator network, and parameters of the first discriminator network can be updated according to the first loss function such that the first discriminator network is trained to discriminate synthetic images from original images. The parameters of the generator network can be updated according to the first loss function such that the generator network is trained to generate photo-realistic synthetic images. The batch of images with presence of anomaly and the batch of images without presence of anomaly as described above can be provided to be processed by the second discriminator network, and parameters of the second discriminator network can be updated according to the second loss function such that the second discriminator network is trained to discriminate images with presence of anomaly from images without presence of anomaly. The parameters of the generator network can be updated again according to the second loss function such that the generator network is trained to generate photo-realistic synthetic images at least part of which contain photo-realistic synthetic anomaly.

For training each discriminator, batches of two types of images are provided iteratively (i.e., each iteration with one batch of each type). Within each iteration, the specific processing order may vary. For example, in some cases, a first batch of a first type of images can be fed to the discriminator first (e.g., one image after another) so that the discriminator can learn image characteristics of the first type, and the second hatch of the second type can be fed after the first batch are processed. In some other cases, every time two images each from a batch of a respective type can be fed to the discriminator so that the discriminator can learn the difference between them and how to distinguish between the two types.

Additionally and optionally, the generator network can be trained further using a third loss function associated with the generator network such that the batch of synthetic images generated therefrom meets a similarity criterion as compared to the corresponding batch of original images. This is to ensure that the generator not only generate realistic images, but also generate images that arc close enough to the original images as input. The similarity criterion can be based on any known similarity metric or function that can quantify the similarity of two images, such as, e.g., L1 (Sum of absolute deviation) or L2 (Least square error), etc.

In some embodiments, the parameters of the neural networks in the neural network system can be iteratively (e.g., through the batches) updated or adjusted during training to achieve an optimal set of parameter values in a trained neural network system. After each iteration, a difference can be determined between the actual output produced by each neural network and the target output associated with the respective training data. The difference can be referred to as an error value or cost value, as described below in detail with reference to FIG. 4. In some cases, training can be determined to be complete when a loss function indicative of the error value is less than a predetermined value, or when a limited change in performance between iterations is achieved, or when the system passes validation as described in detail below.

According to certain embodiments, during training, the neural network system can be validated using one or more validation datasets in order to check if the neural network system is trained well enough so that i) the synthetic images generated by the generator meet a criterion of photo-realism as compared to corresponding original images (e.g., this can be determined with respect to a percentage of accuracy that the first discriminator network reaches during the validation) and ii) the second discriminator neural network is able to discriminate images with anomaly from images without anomaly with a given level of accuracy (e.g., this can be determined with respect to the level of accuracy that the second discriminator network reaches during validation). The validation dataset is a different dataset from the training dataset, and comprises a different set of original images and corresponding random data vectors.

Once the neural network system is properly trained, the second discriminator neural network can be used as an anomaly detection system. Such system can be employed in production/inference to receive an input image capturing a target object and determine presence of anomaly associated with the target object in the input image. The generator neural network can be used as an anomaly generation system which can be employed in production/inference to receive an input image capturing a target object and a random data vector and generate a photo-realistic synthetic image containing photo-realistic synthetic anomaly generated and associated with the target object.

Figure 4:
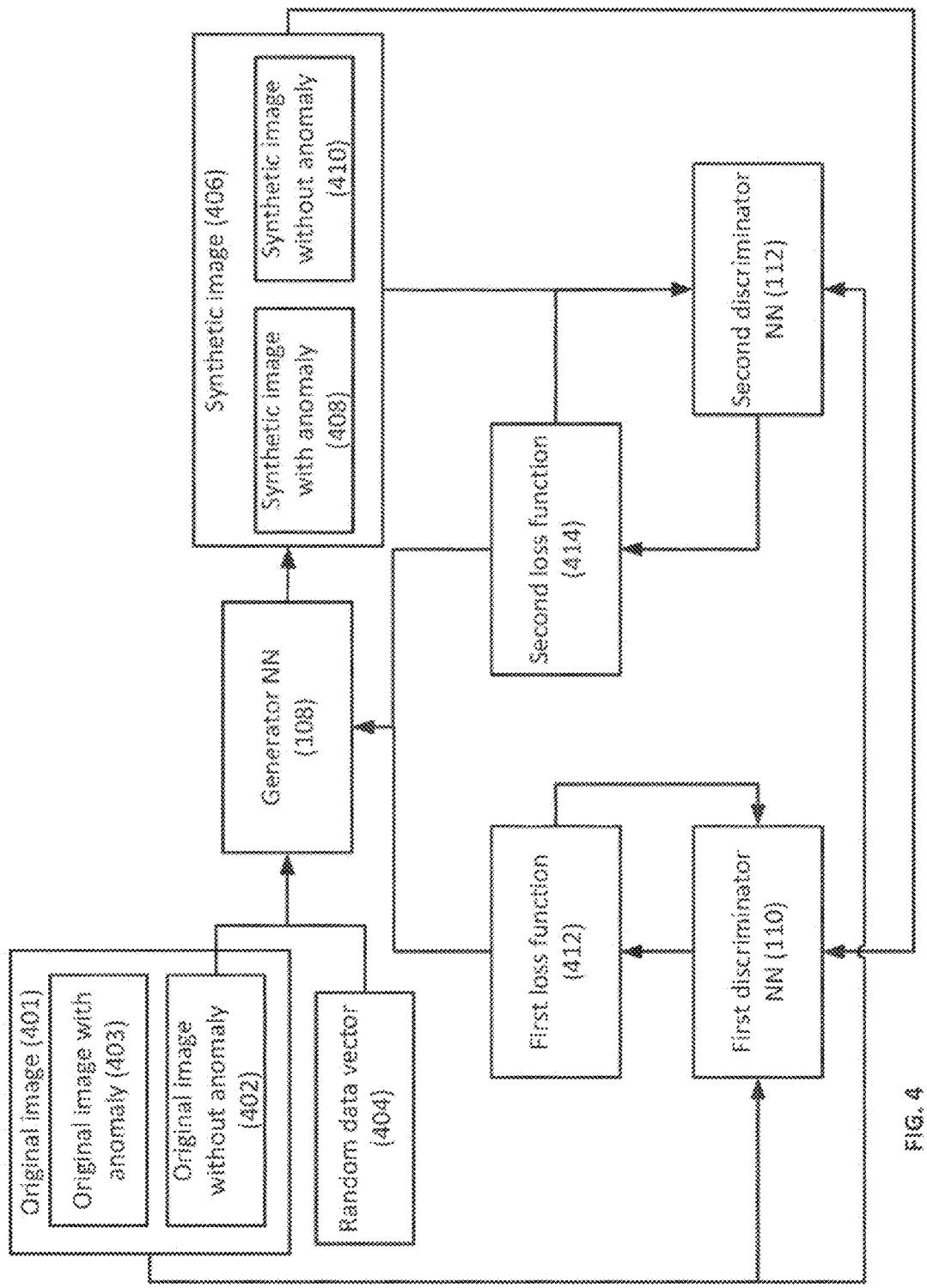
FIG. 4 illustrates a schematic illustration of an exemplified training process of the neural network system in accordance with certain embodiments of the presently disclosed subject matter.

Turning now to FIG. 4, there is shown a schematic illustration of an exemplified training process of the neural network system in accordance with certain embodiments of the presently disclosed subject matter.

A set of original images 401 capturing a target object are obtained as training data for training the neural network system. As illustrated, the set of original images 401 include two subsets: a first subset of original images without anomaly 402 and a second subset of original images with anomaly 403. The training data also include a set of random data vectors 404. To start the training process, the training data can be divided into one or more batches, and each time one batch is fed into the neural network system to be processed. For a given batch of training data including a batch of original images without anomaly 403 and corresponding random data vectors 404, the batch can be provided to the generator neural network (NN) 108 to process and generate a batch of synthetic images 406. The batch of synthetic images 406 as generated includes some images with anomaly 408 and some images without anomaly 410, as explained above.

The original images 401 and the synthetic images 406 are provided to the first discriminator NN 110 to be processed and the first discriminator NN 110 is trained to distinguish between synthetic images and real images. Specifically, for each input image, the first discriminator NN 110 provides arm output value ranging between [0, 1] indicative of whether the input image is predicted to be real or not. For instance, when the output value is 1, it means the input image, is predicted to be fake. When the output value is 0, it means the input image is predicted to be real. It is to be noted that the value indication can also be implemented as the other way around (e.g., 1 means real and 0 means fake).

In a further example, when the output is between 0 and 1, e.g., 0.8, which means the input image is predicted to be not totally fake while in fact the input image is fake, this difference/cost value between the actual output 0.8) and the expected output (i.e., 1) can be reflected through the first loss function 412 and the parameters of the first discriminator NN 110 can be updated (e.g., through back propagation). After the update, the first discriminator NN 110 would be more capable for identifying fake images that the generator generates. In the meantime, the first loss function is also provided to the generator NN 108 for training the generator. For instance, when a synthetic image generated by the generator is correctly predicted to be fake by the first discriminator, or predicted to be with certain level of fakeness (such as in the above example, the output value of the first discriminator is 0.8), the generator also update its parameters with back propagation. After the update, the generator is supposed to be able to generate images that could fool the first discriminator better in order to get the first discriminator to predict them as real. As a result, the first discriminator can be optimized if the generator can generate images that fool the first discriminator, and the generator can be optimized if the first discriminator can correctly identify the fake images.

The generator NN 108 and the second discriminator NN 112 can be trained in a similar manner. From the original images 401 and the synthetic images 406, images with anomaly and images without anomaly are separated and fed into the second discriminator NN 112 to be processed and the second discriminator NN 112 is trained to distinguish between images with or without anomaly. Specifically, for each input image, the second discriminator NN 112 provides an output value ranging between [0, 1] indicative of whether the input image is predicted to be with anomaly or without. For instance, when the output value is 1, it means the input image is predicted to be with anomaly. When the output value is 0, it means the input age is predicted to be without anomaly. Similarly the value indication can also be implemented as the other way around.

Similarly, when the output of the second discriminator 112 is between 0 and 1, e.g., 0.8, which means the input image is predicted to be with certain level of anomaly while in fact the input image is with anomaly, this difference/cost value between the actual output (i.e., 0.8) and the expected output (i.e., 1) can be reflected through the second loss function 414 and the parameters of the second discriminator NN 112 can be updated (e.g., through back propagation). After the update, the second discriminator NN 112 would be more capable for identifying images with anomaly. In the meantime, the second loss function 414 is also provided to the generator NN 108 for training the generator. For instance, when a synthetic image with synthetic anomaly generated by the generator is correctly predicted by the first discriminator, or predicted to be with certain level of anomaly (such as in the above example, the output value of the second discriminator is 0.8), the generator 108 also update its parameters with back propagation. After the update, the generator is supposed to be able to generate images with anomaly that could fool the second discriminator better in order to get the second discriminator not to be able to predict them correctly. As a result, the second discriminator can be optimized if the generator can generate images that fool the second discriminator, and the generator can be optimized if the second discriminator can correctly identify images with anomalies generated by the generator. Optionally, the generator NN 108 can also be optimized using a third loss function (not illustrated) associated with the generator to ensure the synthetic images generated meet a similarity criterion as compared to the corresponding original images.

By repeating the above described training process iteratively using different batches of training data, the neural network system can be trained and optimized to a decent system with high performance.

The neural networks as referred to herein can refer to artificial neural networks which generally comprise a plurality of layers composed of artificial neurons or nodes organized in accordance with respective architectures. By way of not-limiting example, the layers of the neural networks can be organized in accordance with Convolutional Neural Network (CNN) architecture.

It is noted that the teachings of the presently disclosed subject matter are not bound by specific neural network architecture as described above.

Figure 7:
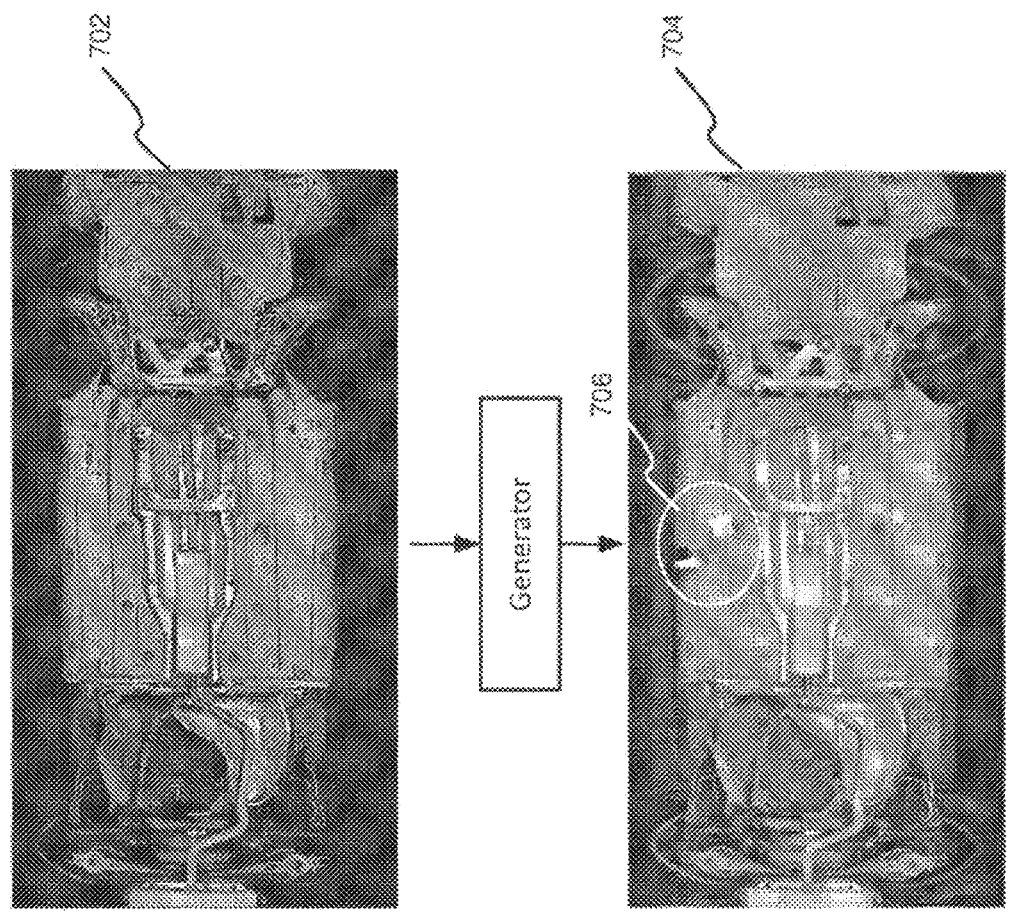
FIG. 7 illustrates an example of an original image without anomaly and a synthetic image with a synthetic anomaly generated using the trained neural network system in accordance with certain embodiments of the presently disclosed subject matter.

FIG. 7 illustrates an example of an original image without anomaly and a synthetic image with a synthetic anomaly generated using the trained neural network system in accordance with certain embodiments of the presently disclosed subject matter. As shown in FIG. 7, the original image 702 as provided to the generator does not contain any anomaly objects, and the corresponding synthetic image 704 as generated by the generator has anomaly objects 706 incorporated into the image. As illustrated, the generated anomaly objects seem to be naturally embedded/integrated with the background in the image.

Figure 8:
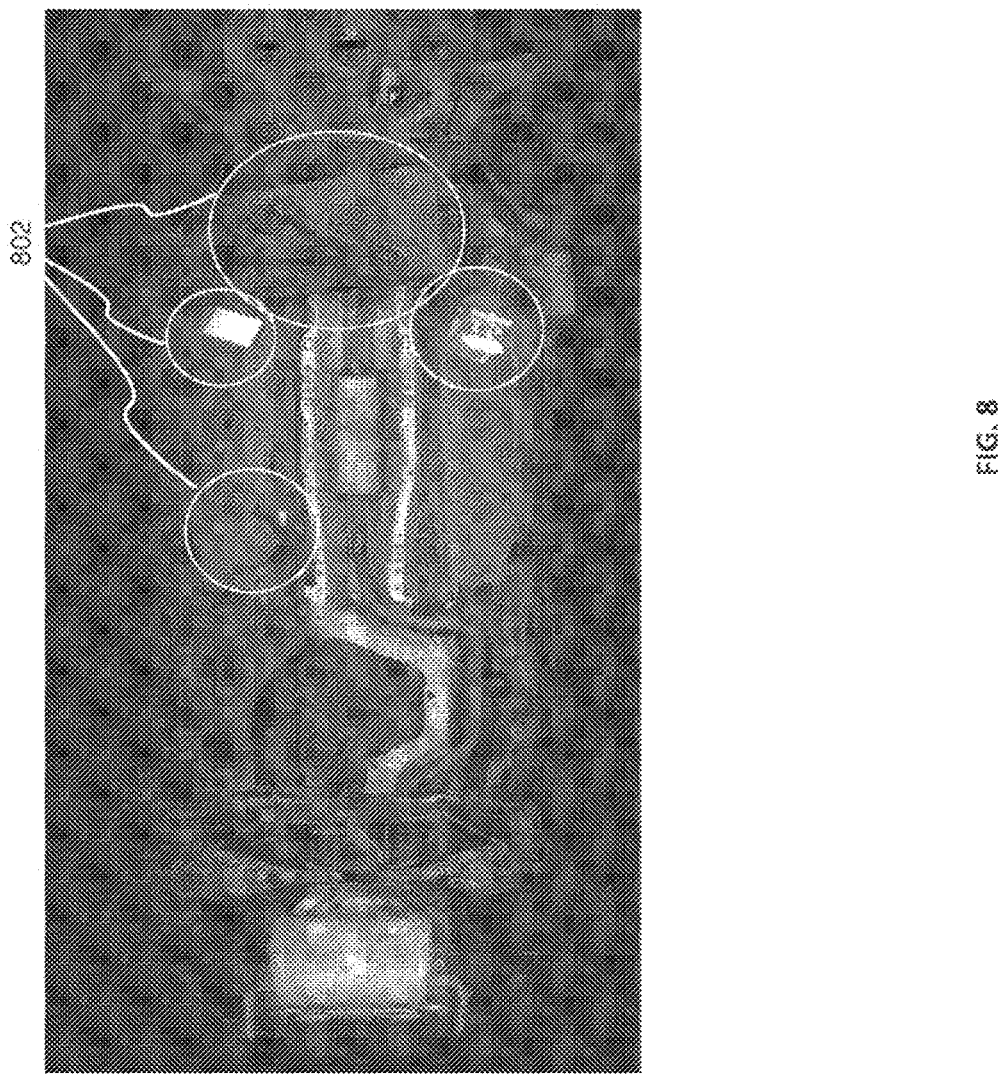
FIG. 8 illustrates an example of an original image with original anomaly objects in accordance with certain embodiments of the presently disclosed, subject matter.

FIG. 8 illustrates an example of an original image with original anomaly objects in accordance with certain embodiments of the presently disclosed subject matter. The original anomaly objects are illustrated as 802. It can be seen that when viewing FIG. 7 with reference to FIG. 8, the generated anomaly objects 706 have a real and natural appearance as compared to the original anomaly objects 802.

It is appreciated that the examples and embodiments illustrated with reference to the training in the present description are by no means inclusive of all possible alternatives but are intended to illustrate non-limiting examples only.

It is to be noted that certain stages/steps illustrated in the figures and/or described with reference thereto, such as blocks 202 and 204 as well as the detailed training order of the three neural networks as described with reference to block 206 and FIG. 3 may be executed differently, such as, e.g., executed in opposite order, and/or executed simultaneously or sequentially. The present disclosure is not limited by the specific order or sequence as illustrated or described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of training a neural network system for anomaly detection, comprising:
   obtaining a training dataset including a set of original images capturing a target object, and a set of random data vectors, wherein the set of original images include a first subset of original images without presence of anomaly associated with the target object and a second subset of original images with presence of anomaly associated with the target object thereof;
   constructing a neural network system comprising a generator neural network, and a first discriminator neural network and a second discriminator neural network operatively connected to the generator neural network; and
   training the generator neural network, the first discriminator neural network and the second discriminator neural network together based on the training dataset, such that: i) the generator neural network is trained using the original images from the first subset and the set of random data vectors, at least based on evaluation of the first discriminator neural network, to generate synthetic images meeting a criterion of photo-realism as compared to corresponding original images, wherein at least part of the synthetic images contain a synthetic anomaly generated and associated with the target object thereof, and wherein the first discriminator neural network is trained to discriminate the synthetic images from the corresponding original images; and ii) the second discriminator neural network is trained based on images with anomaly and images without anomaly from the set of original images including the first subset and the second subset and from the synthetic images wherein at least part thereof contains synthetic anomaly, to discriminate images with presence of anomaly from images without presence of anomaly with a given level of accuracy, thereby giving rise to a trained neural network system.

2. The computerized method of claim 1, wherein the training is performed iteratively for one or more batches of original images from the first subset together with one or more batches of random data vectors from the set of random data vectors.

3. The computerized method of claim 2, wherein the training comprises, for a given batch of original images and a corresponding batch of random data vectors:
   generating, by the generator network, a batch of synthetic images based on the given batch of original images and the given batch of random data vectors, wherein at least part of the batch of synthetic images each contains a synthetic anomaly generated and associated with the target object thereof;
   training the first discriminator network and the second discriminator network based on the batch of original images and the batch of synthetic images using a first loss function associated with the first discriminator network and a second loss function associated with the second discriminator network, and training the generator network using at least the first and second loss functions.

4. The computerized method of claim 3, wherein the first discriminator network and the second discriminator network are trained simultaneously, comprising:
   providing the batch of original images and the batch of synthetic images to be processed by the first discriminator network, and updating parameters of the first discriminator network according to the first loss function; and
   providing a batch of images with presence of anomaly and a batch of images without presence of anomaly to be processed by the second discriminator network, and updating parameters of the second discriminator network according to the second loss function such that the second discriminator network is trained to discriminate images with presence of anomaly from images without presence of anomaly, wherein the batch of images with presence of anomaly includes one or more original images from at least one of the second subset or one or more synthetic images containing synthetic anomaly, and the batch of images without presence of anomaly includes one or more original images from at least one of the first subset or one or more synthetic images not containing synthetic anomaly.

5. The computerized method of claim 3, wherein the training the generator network comprises updating parameters of the generator network according to at least the first and second loss functions such that the generator network is trained to generate photo-realistic synthetic images at least part of which contain photo-realistic synthetic anomaly.

6. The computerized method of claim 3, wherein the first discriminator network and the second discriminator network are trained sequentially, comprising:
   providing the batch of original images and the batch of synthetic images to be processed by the first discriminator network, and updating parameters of the first discriminator network according to the first loss function;
   updating parameters of the generator network according to the first loss function such that the generator network is trained to generate photo-realistic synthetic images;
   providing a batch of images with presence of anomaly and a batch of images without presence of anomaly to be processed by the second discriminator network, and updating parameters of the second discriminator network according to the second loss function such that the second discriminator network is trained to discriminate images with presence of anomaly from images without presence of anomaly, wherein the batch of images with presence of anomaly includes one or more original images from at least one of the first subset or one or more synthetic images containing synthetic anomaly, and the batch of images without presence of anomaly includes one or more original images from at least one of the second subset or one or more synthetic images not containing synthetic anomaly; and
   updating parameters of the generator network according to the second loss function such that the generator network is trained to generate photo-realistic synthetic images at least part of which contain photo-realistic synthetic anomaly.

7. The computerized method of claim 3, wherein the generator network is trained further using a third loss function associated with the generator network such that the batch of synthetic images generated therefrom meets a similarity criterion as compared to the corresponding batch of original images.

8. The computerized method of claim 1, further comprising validating the neural network system using one or more validation datasets to determine whether the neural network system is properly trained.

9. The computerized method of claim 1, further comprising generating one or more synthetic images with presence of anomaly using the trained neural network system.

10. The computerized method of claim 1, further comprising detecting presence of anomaly in one or more input images using the trained neural network system.

11. The computerized method of claim 1, wherein the neural network system relates to Generative adversarial network (GAN).

12. The computerized method of claim 1, wherein the target object of the set of original images is a vehicle and the trained neural network is configured to detect anomaly associated with the vehicle.

13. A computerized method of anomaly detection, comprising:
receiving an input image capturing a target object; and
determining presence of anomaly associated with the target object in the input image using a discriminator neural network, wherein the discriminator neural network is trained together with a generator neural network operatively connected to the discriminator neural network and an additional discriminator neural network operatively connected to the generator neural network based on a training dataset, the training dataset including a set of original images capturing the target object, and a set of random data vectors, wherein the set of original images include a first subset of original images without presence of anomaly associated with the target object and a second subset of original images with presence of anomaly associated with the target object thereof, such that: i) the generator neural network is trained using the original images from the first subset and the set of random data vectors, at least based on evaluation of the additional discriminator neural network, to generate synthetic images meeting a criterion of photo-realism as compared to corresponding original images, wherein at least part of the synthetic images contain a synthetic anomaly generated and associated with the target object thereof, and wherein the additional discriminator neural network is trained to discriminate the synthetic images from the corresponding original images; and ii) the discriminator neural network is trained based on images with anomaly and images without anomaly from the set of original images including the first subset and the second subset and from the synthetic images wherein at least part thereof contains synthetic anomaly, to discriminate images with presence of anomaly from images without presence of anomaly with a given level of accuracy.

14. The computerized method of claim 13, wherein the target object is a vehicle.

15. A computerized method of anomaly generation, comprising:
receiving an input image capturing a target object and a random data vector; and
generating a photo-realistic synthetic image containing photo-realistic synthetic anomaly generated and associated with the target object using a generator neural network, wherein the generator neural network is trained together with a first discriminator neural network and a second discriminator neural network operatively connected to the generator neural network based on a training dataset, the training dataset including a set of original images capturing the target object, and a set of random data vectors, wherein the set of original images include a first subset of original images without presence of anomaly associated with the target object and a second subset of original images with presence of anomaly associated with the target object thereof, such that: i) the generator neural network is trained using the original images from the first subset and the set of random data vectors, at least based on evaluation of the first discriminator neural network, to generate synthetic images meeting a criterion of photo-realism as compared to corresponding original images, wherein at least part of the synthetic images contain a synthetic anomaly generated and associated with the target object thereof, and wherein the additional discriminator neural network is trained to discriminate the synthetic images from the corresponding original images; and ii) the second discriminator neural network is trained based on images with anomaly and images without anomaly from the set of original images including the first subset and the second subset and from the synthetic images wherein at least part thereof contains synthetic anomaly, to discriminate images with presence of anomaly from images without presence of anomaly with a given level of accuracy.

16. The computerized method of claim 15, wherein the target object is a vehicle.

17. A non-transitory computer readable medium storing a discriminator neural network trained to detect anomaly using a method comprising:
receiving an input image capturing a target object;
determining presence of anomaly associated with the target object in the input image using a discriminator neural network, wherein the discriminator neural network is trained together with a generator neural network operatively connected to the discriminator neural network and an additional discriminator neural network operatively connected to the generator neural network based on a training dataset, the training dataset including a set of original images capturing the target object, and a set of random data vectors, wherein the set of original images include a first subset of original images without presence of anomaly associated with the target object and a second subset of original images with presence of anomaly associated with the target object thereof, such that: i) the generator neural network is trained using the original images from the first subset and the set of random data vectors, at least based on evaluation of the additional discriminator neural network, to generate synthetic images meeting a criterion of photo-realism as compared to corresponding original images, wherein at least part of the synthetic images contain a synthetic anomaly generated and associated with the target object thereof, and wherein the additional discriminator neural network is trained to discriminate the synthetic images from the corresponding original images; and ii) the discriminator neural network is trained based on images with anomaly and images without anomaly from the set of original images including the first subset and the second subset and from the synthetic images wherein at least part thereof contains synthetic anomaly, to discriminate images with presence of anomaly from images without presence of anomaly with a given level of accuracy.

\* \* \* \* \*